No. 653,903. Patented July 17, 1900.
T. J. BRAY.
METHOD OF FORMING WROUGHT METAL BANDS.
(Application filed Jan. 18, 1900.)
(No Model.)
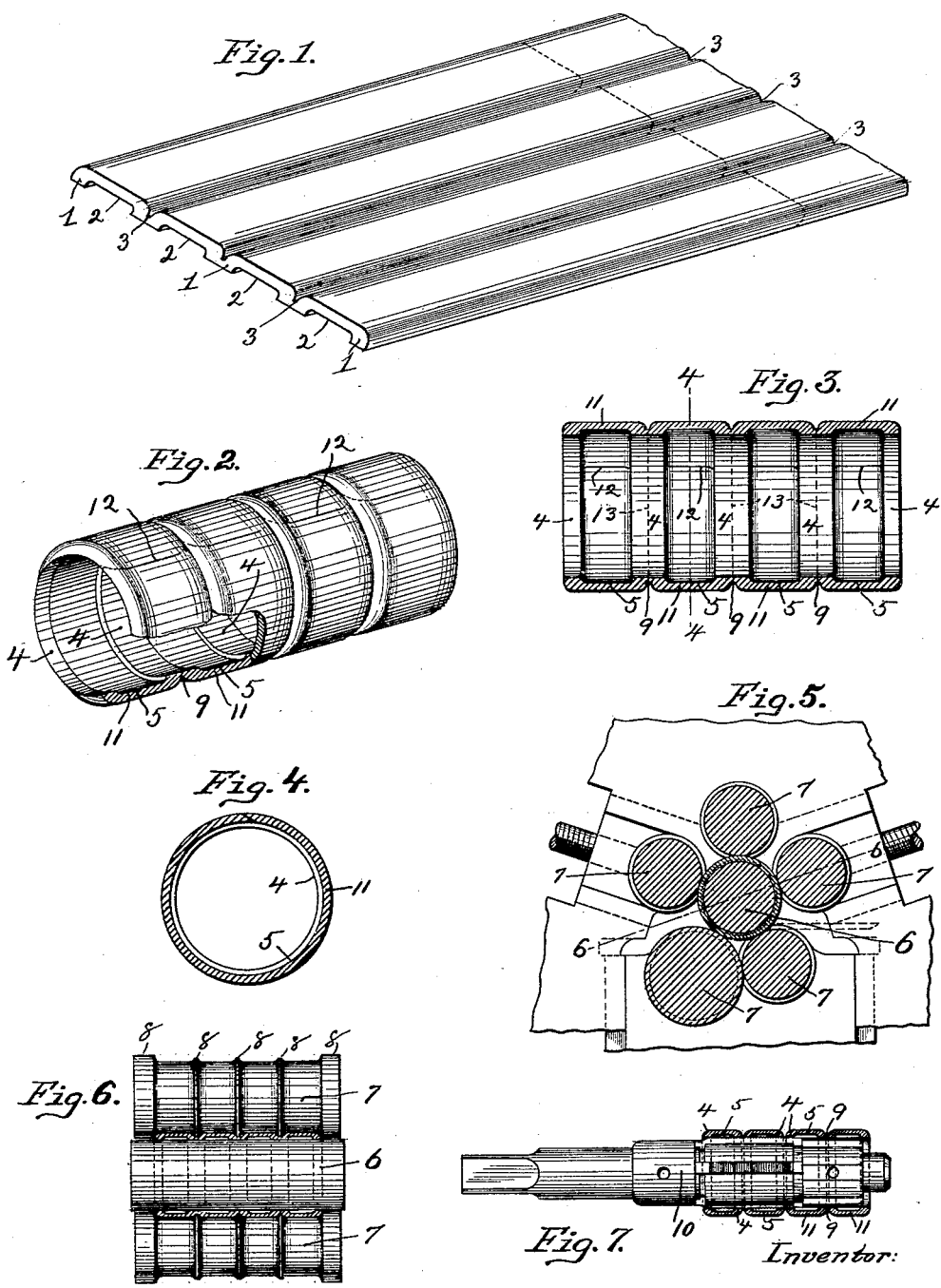

UNITED STATES PATENT OFFICE.

THOMAS J. BRAY, OF PITTSBURG, PENNSYLVANIA, ASSIGNOR TO THE NATIONAL TUBE COMPANY, OF NEW YORK, N. Y., AND McKEESPORT, PENNSYLVANIA.

METHOD OF FORMING WROUGHT-METAL BANDS.

SPECIFICATION forming part of Letters Patent No. 653,903, dated July 17, 1900.

Application filed January 18, 1900. Serial No. 1,853. (No model.)

*To all whom it may concern:*

Be it known that I, THOMAS J. BRAY, a resident of Pittsburg, in the county of Allegheny and State of Pennsylvania, have invented a new and useful Improvement in Methods of Forming Wrought-Metal Bands; and I do hereby declare the following to be a full, clear, and exact description thereof.

My invention relates to the manufacture of tubular bands, these bands being especially useful as thread-protectors for pipes and bars, its object being to provide a simple way of producing thread-protectors or like bands, parts of which extend inwardly beyond the main bodies in the form of ribs, while the edges are welded together as distinguished from being mechanically connected. These thread-protectors are placed over the ends of pipes, heavy bolts, &c., to protect the screw-threads when in transit, and there are two or three important requirements in connection with them. First, as the tubing is shipped in different directions and often for long distances it is practically impossible to return the protectors to the tubeworks, so that they must be made sufficiently cheap to be thrown away after use; second, they must be rigidly connected together, so as to overcome any liability of their springing apart and leaving the threads unprotected during shipment, and, third, a portion of the protector-body must engage with the screw-threads in such way as to prevent injury thereto, though it is not necessary or desirable that the protector should engage with the threads for the entire length of the protector, as this would add to the cost of threading and somewhat to the cost of applying. As large pipes are subjected to especially-heavy strains and blows in shipment, it is important to have such protectors formed with the ends welded together; and the object of the present invention is to provide for the making of such welded rings in a cheap and expeditious manner by producing such welded bands with inwardly-projecting ribs, which may be threaded to engage with the threads of the pipes.

To these general ends I form a bar or blank having longitudinal ribs on one face and bend this blank into tubular form with the ribs on the inner face and then weld the meeting ends of these ribs around an ordinary mandrel and strip the blank longitudinally from the mandrel. In order to produce a number of such bands at one time, I form the bar with a number of such alternating depressions and ribs on one side and bend it into tubular form with the ribs on the inner face and weld the meeting ends of the ribs and separate the blank during the rolling operation into a number of connected or disconnected rings, and I separate the blanks so produced in the subsequent threading operation. In the blanks as so produced it is not essential that the edges of the bodies of the blank should be welded, the only essential being that the rib portions should be so welded.

To enable others skilled in the art to practice my invention, I will describe the same more fully, referring to the accompanying drawings, in which—

Figure 1 is a perspective view of the rolled bar employed in the making of the article. Fig. 2 is a perspective view of the finished article. Fig. 3 is a longitudinal section of the same. Fig. 4 is a cross-section on the line 4 4, Fig. 3. Fig. 5 is a cross-section of the welding-machine. Fig. 6 is a longitudinal section on the line 6 6, Fig. 5; and Fig. 7 is a detailed view illustrating the threading of the finished bands.

In the regular rolling of the metal preparatory to cutting into blanks for forming the bands I prefer to roll bars of the section illustrated in Fig. 1, which provide for the formation of a number of thread-protectors or like bands at one time. For example, the bar has the ribs 1 separated by the comparatively-wide depressions 2, the upper or outer face of the bar being either plain or having slight grooves 3 formed therein at the points where the bands are to be subsequently separated into couplings, though, as described in the application of David Heggie for method of forming rings and couplings, filed October 14, 1899, Serial No. 733,595, these depressions may be rolled in the blanks in process of welding. It will be noticed that in the blanks as cut from the bar they are made up of a series of thick and thin portions, and the object is to form from this bar a welded blank or series of blanks having inwardly-projecting ribs, as at 4, separated by depressions 5, so that when used for thread-protectors or for like purposes it will only be necessary to thread the faces 4, leaving the recesses 5 blank, the cost of the threading operation and the wear on the threading-dies being thus very materially reduced. The blanks can be welded into ring or band form on any suitable machine, that illustrated in the drawings being a welding-machine providing for the welding of the blanks around a central madrel 6 by means of a cluster of welding-rolls 7, such rolls being illustrated in said Heggie application above referred to and the specific form of rolls being illustrated in application for patent filed by Lavoo and Bray on the 31st day of October, 1899, Serial No. 735,362, so that they do not need any extended description. It is preferred to form a number of such bands at one time, and for that purpose while the mandrel 6 is plain-faced and necessarily so, for the reason hereinafter described, the cluster of rolls is provided with ribs 8, serving to finish the end portions of the different bands, and, if desired, to divide the bar or blank into a number of such separate rings in the rolling operation. It is preferred, however, that the rings will be formed with slight connecting-webs, as shown at 9, in which case they are separated in the threading operation, which is illustrated in Fig. 7, the threading-tap 10 while threading the ribs 4 cutting through such thin web 9 and separating the bands from each other, as fully described in said Heggie application.

In the making of bands the blanks are cut from the bar, as indicated in Fig. 1, and they are then placed in a furnace and heated to a welding heat. They are then fed to the welding-machine with the ribs 1 in such position as to be brought on the inner face of the welded band, and the welding-rolls by working upon such ribs or thickened portions of the blank weld the same together, though the recesses 5 in the finished blank formed by the recesses 2 in the bar are not brought into contact with the plain face of the mandrel 6, and the only positive welding pressure is brought upon the rib portions of the bar or blank. In this way the bar can be formed with less pressure and less power than if it were attempted to weld the bar for its entire width, as only such welding pressure need be exerted as is necessary to weld together the rib portions 1, so as to form the thickened inwardly-projecting rib portions 4 of the finished blank. As the thin walls 11 between the recesses 2 and the outer faces of the blanks are brought to a welding heat the edges of such thin portions may stick together and form an initial weld; but it is not necessary for the production of such articles as thread-protectors, the only essential being that the thick rib portions shall be properly welded. It therefore often occurs that while the rib portions are welded the thin portions of the bands are not welded, and this is illustrated in the accompanying drawings by the line 12, indicating the meeting but unwelded edges of the blank. The blank as so produced upon the mandrel is withdrawn from the welding-machine, and though it is formed with the inner recesses 5, above referred to, as it is formed upon a plain-faced mandrel, it can be stripped therefrom, producing a finished blank, such as shown in Figs. 2 and 3, and, if it is desired, producing a series of separate rings, which is indicated by the dotted lines 13 in Fig. 3. After the blanks have cooled it is only necessary to thread them to produce the finished thread-protectors, and on account of the wide recesses in the inner faces of the blanks such threading operation is very materially cheapened and quickened, and if the blanks are connected together by the thin webs 9 they can be separated during the threading operation, as above referred to. In this way exceedingly light and cheap thread-protectors are produced, which are, however, as stiff as necessary on account of the thick rib portions and which have positively-welded edges as distinguished from mere mechanically-connected portions, the blanks being further distinguished in the fact that the threaded portions are thus positively welded or connected instead of the portions between the threaded faces. Each blank is formed with one or more inwardly-projecting ribs, according to the width of the protector or the special duty to be performed.

What I claim is—

1. The improvement in the art of making thread-protectors and like bands, which consists in forming blanks having longitudinal ribs on one face, bending said blank into tubular form with the ribs on the inner face and welding the meeting ends of the ribs.

2. The improvement in the art of making thread-protectors, which consists in forming a blank having a plurality of longitudinal recesses separated by ribs on one side, bending said blank into tubular form with the ribs on the inner face, and welding the meeting ends of the ribs and shaping the ends of several rings by forming depressions opposite to said ribs.

3. The improvement in the art of making thread-protectors, which consists in forming a blank having a plurality of longitudinal recesses separated by ribs on one side, bending said blank into tubular form with the ribs on the inner face, and welding the meeting ends of the ribs and shaping the ends of several rings by forming depressions opposite to said ribs, stripping the blank from the mandrel and subsequently threading the same and thereby separating the bands from each other.

4. The improvement in the art of making thread-protectors, which consists in forming a blank having a plurality of longitudinal recesses separated by ribs on one side and grooves on the other side opposite said ribs, bending said blank into tubular form with the ribs on the inner faces and welding the meeting ends of the ribs and shaping the ends of several bands by rolling in the grooves on the opposite faces.

5. The improvement in the art of making thread-protectors, which consists in forming a blank having longitudinal ribs on one face, bending said blank into tubular form with the ribs on the inner face, and then welding the meeting ends of the ribs or thick portions only.

In testimony whereof I, the said THOMAS J. BRAY, have hereunto set my hand.

THOMAS J. BRAY.

Witnesses:
GRACE C. RAYMOND,
ROBERT C. TOTTEN.